US008756264B2

(12) United States Patent
Sussman et al.

(10) Patent No.: US 8,756,264 B2
(45) Date of Patent: Jun. 17, 2014

(54) PARALLEL PSEUDORANDOM NUMBER GENERATION

(75) Inventors: Myles A. Sussman, San Mateo, CA (US); William Y. Crutchfield, Pleasanton, CA (US); Matthew N. Papakipos, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1648 days.

(21) Appl. No.: 11/716,379

(22) Filed: Mar. 9, 2007

(65) Prior Publication Data
US 2007/0294508 A1 Dec. 20, 2007

Related U.S. Application Data (60) Provisional application No. 60/815,532, filed on Jun. 20, 2006, provisional application No. 60/903,188, filed on Feb. 23, 2007.

(51) Int. Cl.
*G06F 1/02* (2006.01)

(52) U.S. Cl.
USPC .......................................... 708/253; 708/256

(58) Field of Classification Search
USPC ................................ 708/253, 256
See application file for complete search history.

(56) References Cited

U.S. PATENT DOCUMENTS

| 5,327,365 | A | * | 7/1994 | Fujisaki et al. | ............... | 708/254 |
| 5,519,736 | A | * | 5/1996 | Ishida | ........................... | 375/367 |
| 6,594,680 | B1 | * | 7/2003 | Gu et al. | ...................... | 708/256 |
| 6,831,905 | B1 | * | 12/2004 | Lomp et al. | .................. | 370/335 |

OTHER PUBLICATIONS

Advanced Micro Devices, AMD Core Math Library (ACML), Chapter 6, Ver. 4.0.0, http://developer.amd.com, 2003-2007.
Blythe, D., "The Direct3D 10 System," ACM Transactions on Graphics, vol. 25, No. 3, Jul. 2006.
Engel, W., "Programming Vertex and Pixel Shaders," Charles River Media, Inc., 2004, pp. 3-24, 341-389.
Entacher, K., "A Collection of Selected Pseudorandom Number Generators with Linear Structures," Tech. Rep. TR-97-1, ACPC, Austrian Center for Parallel Computation, 1997, 24 pages.
Entacher, K., et al., "Linear and Inversive Pseudorandom Numbers for Parallel and Distributed Simulation," IEEE Proceedings of the $12^{th}$ Workshop on Parallel and Distributed Simulation, 1997, pp. 90-97.
Hars, L., "Modular Inverse Algorithms Without Multiplications for Cryptographic Applications," EURASIP J. on Embedded Systems, 2006, pp. 1-13.
Intel Corporation, "Intel Math Kernel Library—Vector Statistical Library Notes," 2003-2007.
Knuth, D.E., "The Art of Computer Programming" 3 ed., vol. 2: Seminumerical Algorithms, Addison-Wesley, 1997, Chapter 3, pp. 1-193.
L'Ecuyer, P., "Good Parameters and Implementations for Combined Multiple Recursive Random Number Generators," http:// iro. umontreal.ca, May 4, 1998, 19 pages.

(Continued)

*Primary Examiner* — Chuong D Ngo
(74) *Attorney, Agent, or Firm* — Morgan, Lewis & Bockius LLP (57) ABSTRACT

A method of generating pseudo-random numbers on a parallel processing system comprises generating a plurality of sub-streams of pseudo-random numbers, wherein the sub-streams are generated in parallel by one or more co-processors, and providing the plurality of sub-streams to respective processing elements, wherein the respective processing elements employ the plurality of sub-streams to execute an application.

13 Claims, 7 Drawing Sheets

(56) References Cited

OTHER PUBLICATIONS

L'Ecuyer, P., "Combined Multiple Recursive Random Number Generators," Operations Research 44, 5 (1995).

L'Ecuyer, P., et al., "TestU01: A C Library for Empirical Testing of Random Number Generators," ACM Transactions on Mathematical Software, vol. V, No. N, 2005.

L'Ecuyer, P., et al., "An Object-Oriented Random-Number Package with Many Long Streams and Substreams," Operations Research, vol. 50, No. 6, 2002.

Leeb, H., "Random Numbers for Computer Simulation," Master's Thesis, University of Salzburg, 1995.

Lindholm, E., et al., "A User-Programmable Vertex Engine," ACM SIGGRAPH 2001, Los Angeles, California, Aug. 12-17, 2001, pp. 149-158.

Maclaren, N.M., "The Generation of Multiple Independent Sequences of Pseudorandom Numbers," Applied Statistics, vol. 38, No. 2, 1989, pp. 351-359.

Maclaren, M.D., et al., "Uniform Random Number Generators," J. of Association of Computing Machinery, vol. 12, No. 1, Jan. 1965), pp. 83-89.

Mascagni, M., et al., "SPRNG: A Scalable Library for Pseudorandom Number Generation," Recent Advances in Numerical Methods and Applications II, Proceedings of NMA, 1998.

Matsumoto, M., et al., "Merssene Twister: A 623-Dimensionally Equidistributed Uniform Pseudo-Random Number Generator," ACM Trans. on Modeling and Computer Simulations, vol. 8, No. 1, Jan. 1998, pp. 3-30.

Menezes, A., et al., "Handbook of Applied Cryptography," CRC Press, Chapter 5, 1996.

Olano, M., "Modified Noise for Evaluation on Graphics Hardware," Graphics Hardware, 2005.

Owens, J.D., et al., "A Survey of General-Purpose Computation on Graphics Hardware," Eurographics 2005 State of the Art Report, 2005, pp. 21-51.

Peakstream, Inc., "The Peakstream Platform: High Productivity Software Development for Multi-Core Processors," 2006.

Schoo, M., et al., "A Survey and Empirical Comparison of Modern Pseudo-Random Number Generators for Distributed Stochastic Simulations," Tech. Rep. TR-CSSE-03/05, University of Canterbury, New Zealand, 2005.

Stipcevic, M., "The Diehard Battery of Stringent Statistical Randomness Tests," http://random.com.hr/products/random/manual/html/diehard.html, 2001.

Sussman, M., et al., "Pseudorandom Number Generation on the GPU," Graphics Hardware, 2006, pp. 1-8.

Wegenkittl, S., "Are there hyperbolas in the scatter plots of inversive congruential pseudorandom numbers?" J. of Computational and Applied Mathematics, vol. 95, issue 1-2, Aug. 1998, pp. 117-125.

\* cited by examiner

PARALLEL PSEUDORANDOM NUMBER GENERATION

RELATED APPLICATIONS

This application claims priority to U.S. provisional Patent Application 60/815,532, "Systems and Methods for High Performance Computing Using Stream Processors", filed on Jun. 20, 2006, which is hereby incorporated by reference in its entirety.

This application claims priority to U.S. provisional Patent Application 60/903,188, "Programming Tools for a High-Performance Computing System," filed on Feb. 23, 2007, which is hereby incorporated by reference in its entirety.

TECHNICAL FIELD

The disclosed embodiments relate generally to random number generation, and more particularly, to generating parallel streams of random numbers.

BACKGROUND

Pseudorandom number generation (PRNG or simply RNG) is an important element of many computer applications, including parallel and distributed simulations. Improper PRNG can result in generation of highly correlated and statistically dependent pseudorandom numbers that produce incorrect simulation results. For example, splitting linear congruential generators for use in parallel computing environments may produce highly correlated parallels streams of pseudorandom numbers. PRNG can also be computationally demanding, thereby limiting simulation performance. For example, inversive generators that compute an inverse modulus function may limit performance when implemented using traditional iterative techniques.

Accordingly, there is a need for random number generators that efficiently generate parallel streams of pseudorandom numbers (PRNs).

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

In accordance with some embodiments, a method of generating pseudo-random numbers on a parallel processing system comprises generating a plurality of sub-streams of pseudo-random numbers, wherein the sub-streams are generated in parallel by one or more co-processors, and providing the plurality of sub-streams to respective processing elements, wherein the respective processing elements employ the plurality of sub-streams to execute an application.

In accordance with some embodiments, a method of generating pseudo-random numbers on a parallel processing system comprises generating a plurality of sub-streams of pseudo-random numbers, wherein the sub-streams are generated in parallel. Generating the plurality of sub-streams comprises storing, in a first processing element, a state associated with a first element in a respective sub-stream of the plurality of sub-streams; advancing the state in the first processing element. Generating the plurality of sub-streams further comprises providing the advanced state to a second processing element, wherein the second processing element calculates a second element in the respective sub-stream in accordance with the advanced state. The plurality of sub-streams is provided to respective processing elements, wherein the respective processing elements employ the plurality of sub-streams to execute an application.

In accordance with some embodiments, a method of generating pseudo-random numbers on a parallel processing system comprises generating a plurality of sub-streams of pseudo-random numbers, wherein the sub-streams are generated in parallel. A respective sub-stream in the plurality of sub-streams is generated by a non-linear random number generator. Generating the respective sub-stream comprises computing an index location and reading from an indexed table a value stored at the computed index location. The plurality of sub-streams is provided to respective processing elements, wherein the respective processing elements employ the plurality of sub-streams to execute an application.

In accordance with some embodiments, a parallel processing system for generating pseudo-random numbers comprises one or more co-processors configured to generate in parallel a plurality of sub-streams of pseudo-random numbers and one or more processing elements configured to receive the plurality of sub-streams and to employ the plurality of sub-streams to execute an application.

In accordance with some embodiments, a computer program product for use in conjunction with a parallel processing system comprises a computer readable storage medium and a computer program mechanism embedded therein. The computer program mechanism comprises instructions for generating a plurality of sub-streams of pseudo-random numbers, wherein the sub-streams are generated in parallel by one or more co-processors, and instructions for providing the plurality of sub-streams to respective processing elements, wherein the respective processing elements employ the plurality of sub-streams to execute an application.

In accordance with some embodiments, a parallel processing system for generating pseudo-random numbers comprises means for generating a plurality of sub-streams of pseudo-random numbers, wherein the sub-streams are generated in parallel by one or more co-processors, and means for providing the plurality of sub-streams to respective processing elements, wherein the respective processing elements employ the plurality of sub-streams to execute an application.

Many computer applications (e.g., statistical applications such as Monte-Carlo simulations) employ one or more pseudorandom number generators (PRNGs or just RNGs) to generate streams of pseudorandom numbers (PRNs), also referred to as sequences of PRNs. PRNs are referred to as pseudorandom because they are repeatable and deterministic, unlike true random numbers. In some embodiments, RNGs are used to solve stochastic differential equations, for example to determine stock option pricing. In some embodiments, RNGs are used in the well-known optimization technique of simulated annealing. Simulated annealing may be used, for example, in electronic circuit place-and-route applications. Another well-known optimization technique involving RNGs, in accordance with some embodiments, is genetic algorithms, which may be used for example to optimize a controller. In some embodiments, RNGs are used in scheduling algorithms, for example in disk scheduling or in production planning and scheduling. In some embodiments, RNGs are used to generate sequences and permutations, for examping to analyze DNA sequence shuffling. In some embodiments, RNGs are used to implement graph partitioning algorithms for applications such as data clustering and information retrieval. In some embodiments, RNGs are used in cryptographic applications. Numerous other RNG applications are possible.

In some embodiments, RNGs are implemented in parallel-processing computer systems. The term "parallel-processing computer system" herein refers to a computing system that is capable of performing multiple operations simultaneously. A parallel-processing computer system may contain one or more processing elements including, but not limited to, processors, co-processors, and hybrid processors, which may be deployed on a single computer or a plurality of computers linked (wired and/or wireless) by a network in a cluster or grid or other types of configuration. A co-processor is a processor used to supplement the functions of a central processing unit (CPU), in accordance with some embodiments. Examples include graphics processing units (GPUs), math accelerators that perform floating point arithmetic, signal processors, encryption processors, and FPGAs or ASICs configured to supplement CPU functions. In some embodiments, a hybrid processor performs functions associated with both CPUs and GPUs.

In some embodiments, a processing element includes one or more cores, which may share at least a portion of the same instruction set or use completely different instruction sets. The cores within a processing element may share at least a portion of a common memory space and/or have their own memory spaces. Mechanisms used to implement parallel execution of the operations include, but are not limited to, multiple-instruction-multiple-data (MIMD) execution of multiple instruction sequences, single-instruction-multiple-data (SIMD) execution of a single instruction sequence, vector processing, pipelining, hardware multi-threading, very-long-instruction-word (VLIW) or explicitly-parallel-instruction-computing (EPIC) instructions, superscalar execution, and a combination of at least two of the aforementioned mechanisms. The parallel-processing computer system as a whole may use a single system image, multiple system images, or have no underlying operating system.

In some embodiments, a processing element or a core within a processing element may or may not run an operating system or a virtual machine monitor (e.g., hypervisor) that manages one or more operating systems running on a computer system at the same time. Examples of such processors and co-processors include GPUs by nVidia and ATI, single-core and multiple-core x86 and Itanium processors by Intel, single- and multiple-core x86 and x86-64 processors by AMD, single-core and multiple-core PowerPC processors by IBM, the Cell processor by STI, the Niagara processor by Sun Microsystems, and the Threadstorm processor or X1E multi-streaming processor by Cray, Inc.

In some embodiments, a processing element may be a thread, such as an application-level thread, kernel thread, or hardware thread, running on a physical processor or virtual machine. In some other embodiments, a processing element may be a virtual machine running inside a hypervisor. In other embodiments, a processing element may be a functional unit within a physical processor or a virtual machine.

In some embodiments, RNGs are implemented as combined generators, which combine multiple PRN sequences generated by multiple respective RNGs. An example of a combined generator is a combined explicit inverse congruential generator (CEICG). For explicit generators such as CEICGs, each element in the resulting PRN sequence is a function of the element's location in the sequence and not of previous elements in the sequence. CEICGs thus require a small amount of seed or state data, which makes them a suitable choice for a processor with large numbers of virtual threads and a limited number of outputs per thread. In some embodiments, combined generators such as CEICGs are used in applications with processors having thousands of virtual threads, or having millions of virtual threads.

A CEICG is computed from two or more explicit inverse congruential generators (EICGs). An EICG is computed from the formulas:

$$x_n = \overline{a(n+n_0)+c} \bmod m = EICG(m, a, c, n_0) \quad (1)$$
$$u_n = \frac{x_n}{m}$$

where a is the multiplier, m is the modulus, c is the increment, $n_0$ is the seed, and $u_n$ is the normalized nth element of the PRN sequence $\{u_0, u_1, u_2, \ldots\}$ generated by the EICG. The horizontal bar indicates inversion modulo m, where m is a prime number, with special handling of zero argument:

$$k \cdot \overline{k} = 1 (\bmod m), k \neq 0 \overline{k} = 0, k = 0 \quad (2)$$

EICGs and CEICGs are thus types of inversive generators. More broadly, EICGs and CEICGs are types of non-linear generators, defined as generators whose basic operations are not limited to multiplication, addition, and modulus. They also are explicit generators: each value in the random number sequence can be explicitly computed from the index n, and does not depend on any previous values in the sequence.

The period of the sequence $\{u_n\}$ produced by an EICG, also referred to as the sequence length, is equal to the modulus m. In some embodiments, two or more sequences generated by respective EICGs are combined to generate a CEICG sequence with a longer period than the periods of each of the two or more sequences. The output of several EICGs can be written:

$$x_{n1} = EICG(m_1, a_1, c_1, n_{01}) \quad (3)$$
$$\vdots$$
$$x_{nj} = EICG(m_j, a_j, c_j, n_{0j})$$

where $x_{nj}$ is the $n^{th}$ output of the $j^{th}$ EICG. The CEICG sequence $\{u_n\}$ is given by summing the normalized elements and discarding the integer portion of the result, an operation that is written as:

$$u_n = \left(\frac{x_{n1}}{m_1} + \cdots + \frac{x_{nj}}{m_j}\right) \bmod 1 \tag{4}$$

The period of the combined generator, L, is the product of the prime moduli of the combined EICGs, if they are distinct: $L = m_1 \times \ldots \times m_j$.

In a parallel application using pseudorandom numbers, in accordance with some embodiments, each parallel thread or process has a statistically independent sequence of PRNs. In some embodiments, a PRN sequence (e.g., a sequence generated by a combined generator) is parallelized according to cycle-splitting algorithms, in which the sequence is broken into sub-sequences. For example, a sequence may be broken into P sub-sequences of length B. Two exemplary methods of implementing cycle-splitting are the leapfrog method and the blocking method.

Figure 1A:
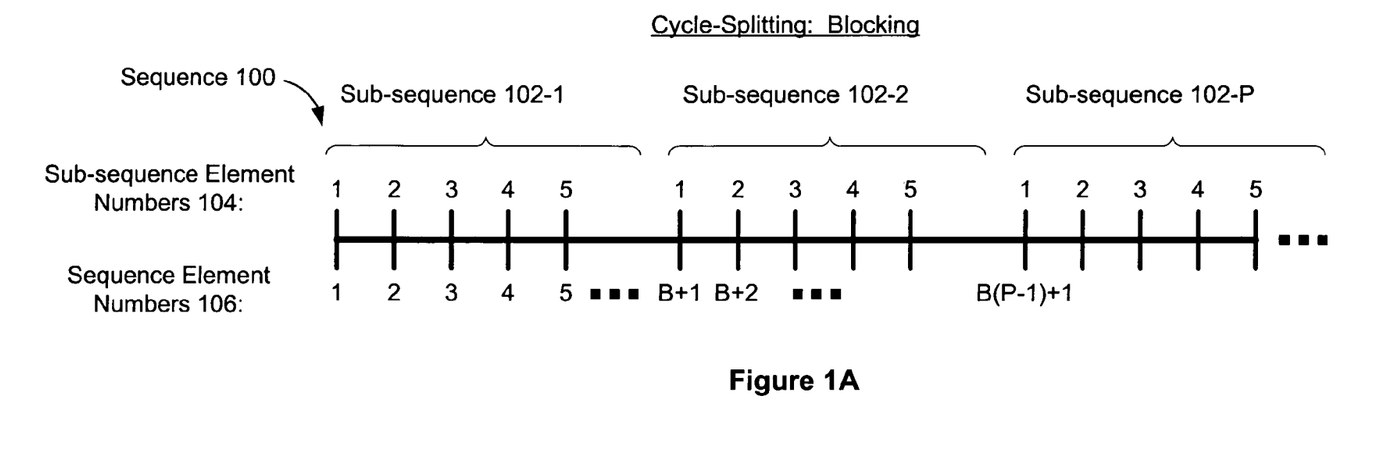
FIGS. 1A & 1B are schematic diagrams illustrating a random number sequence broken into sub-sequences in accordance with some embodiments.

FIG. 1A is a schematic diagram illustrating a random number sequence 100 broken into P subsequences 102 of length B by the blocking method, where P and B are integers, in accordance with some embodiments. Sequence 100 comprises a total of PB random numbers, or elements, where each element is labeled by a sequential element number 106. The first B elements in the sequence 100 are assigned to a first sub-sequence 102-1. The next B elements in the sequence 100 are assigned to a second sub-sequence 102-2. This process of assigning B sequential elements in sequence 100 to a particular sub-sequence 102 is continued until P sub-sequences 102 have been created. Each sub-sequence 102 comprises B elements labeled by sequential element numbers 104. An $i^{th}$ sub-sequence produced by the blocking method thus equals $\{u_{iB}, U_{iB+1}, U_{iB+2}, \ldots\}$.

Figure 1B:
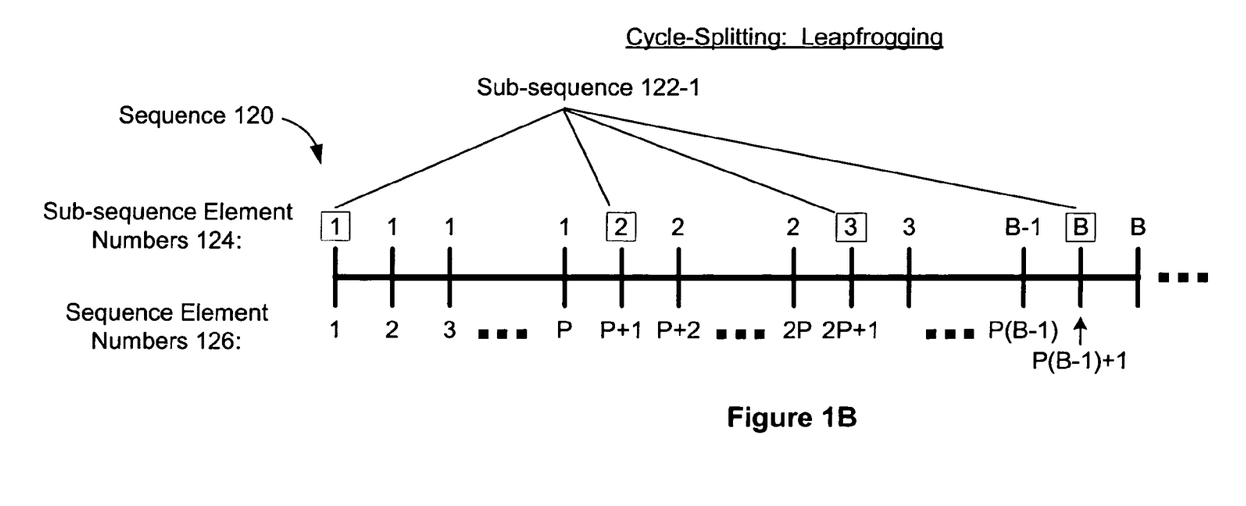

FIG. 1B is a schematic diagram illustrating a random number sequence 120 broken into P subsequences 122 of length B by a leapfrogging method, in accordance with some embodiments. Sequence 120 comprises a total of PB random numbers, or elements, where each element is labeled by a sequential element number 126. Starting with the first element in sequence 120, every Pth element is assigned to a first sub-sequence 122-1. Starting with the second element in sequence 120, every Pth element is assigned to a second subsequence (not shown). This process of assigning every Pth element in sequence 120 to a particular sub-sequence 122 is continued until P sub-sequences 122 have been created. Each sub-sequence 122 comprises B elements labeled by sequential element numbers 124. An $i^{th}$ sub-sequence produced by the leapfrog method thus equals $\{u_i, u_{i+P}, u_{i+2P}, \ldots\}$. A deterministic stream of PRNs is created regardless of the order in which the sub-sequences are generated.

With blocking, given a sub-sequence length B, the index parameter n in an EICG is replaced by n+B*s for producing sub-sequence s:

$$x_{n,s} = \overline{a(n+Bs+n_0)+c} \bmod m \tag{5}$$

The length of the resulting CEICG sequence is given by $L = P \cdot B$.

On a processor (e.g., a co-processor, such as a GPU) with vector instructions, leapfrogging can be used to assign consecutive values of a sequence to components of the vectors. For example, a 4-vector of results may be generated using the relation:

$$x_{n,s} = a\left(4n + \begin{pmatrix} 0 \\ 1 \\ 2 \\ 3 \end{pmatrix} + Bs + n_0\right) + c \bmod m \tag{6}$$

In this example, if leapfrogging is combined with blocking, then the length of each sub-sequence is B/4 and each thread produces four sub-sequences.

In some embodiments, the formulation of equation (6) is used on a GPU with Single Instruction, Multiple Data processing units (e.g., native float4 processing units). For brevity in the rest of the discussion, the scalar equations are used.

In some embodiments, a combined generator for a sub-sequence s with block size B is $$u_{n,s} = \left(\frac{x_{n1,s}}{m_1} + \cdots + \frac{x_{nj,s}}{m_j}\right) \bmod 1 \tag{7}$$

where each component generator sub-sequence is computed from:

$$x_{nj,s} = \overline{a(n_j+Bs+n_{0j})+c_j} \bmod m_j \tag{8}$$

In some embodiments, the modulus, multiplier, and increment are different for each component generator (e.g., each component EICG), but the block size is a property of the combined generator and thus is the same for each component generator. The state of the generator is represented by the small set of numbers $\{n_1, n_2, \ldots, n_j\}$, which can be considered a global quantity since it is independent of the sub-sequence. After each call to the generator, the $n_j$ values are incremented by 1. In some embodiments, to avoid having to store any numbers larger than the prime modulus m, the following relation is used:

$$\overline{k} \bmod m = \overline{(k \bmod m)} \bmod m \tag{9}$$

In some embodiments, for example, when the state of the generator is advanced, the following algorithm is used:

$$n_j \leftarrow (n_j+1) \bmod m_j \tag{10}$$

In some embodiments, all intermediate computations in Equation (8) may also be performed using no more bits of storage than required by the modulus $m_j$.

In some embodiments, the state of a generator is maintained and advanced by the same processing element that generates the corresponding PRNs. For example, if a RNG is implemented in a co-processor such as a GPU, the co-processor maintains and advances the state of the generator. In some embodiments, however, the state of the generator is maintained and advanced by a separate processing element.

Figure 2A:
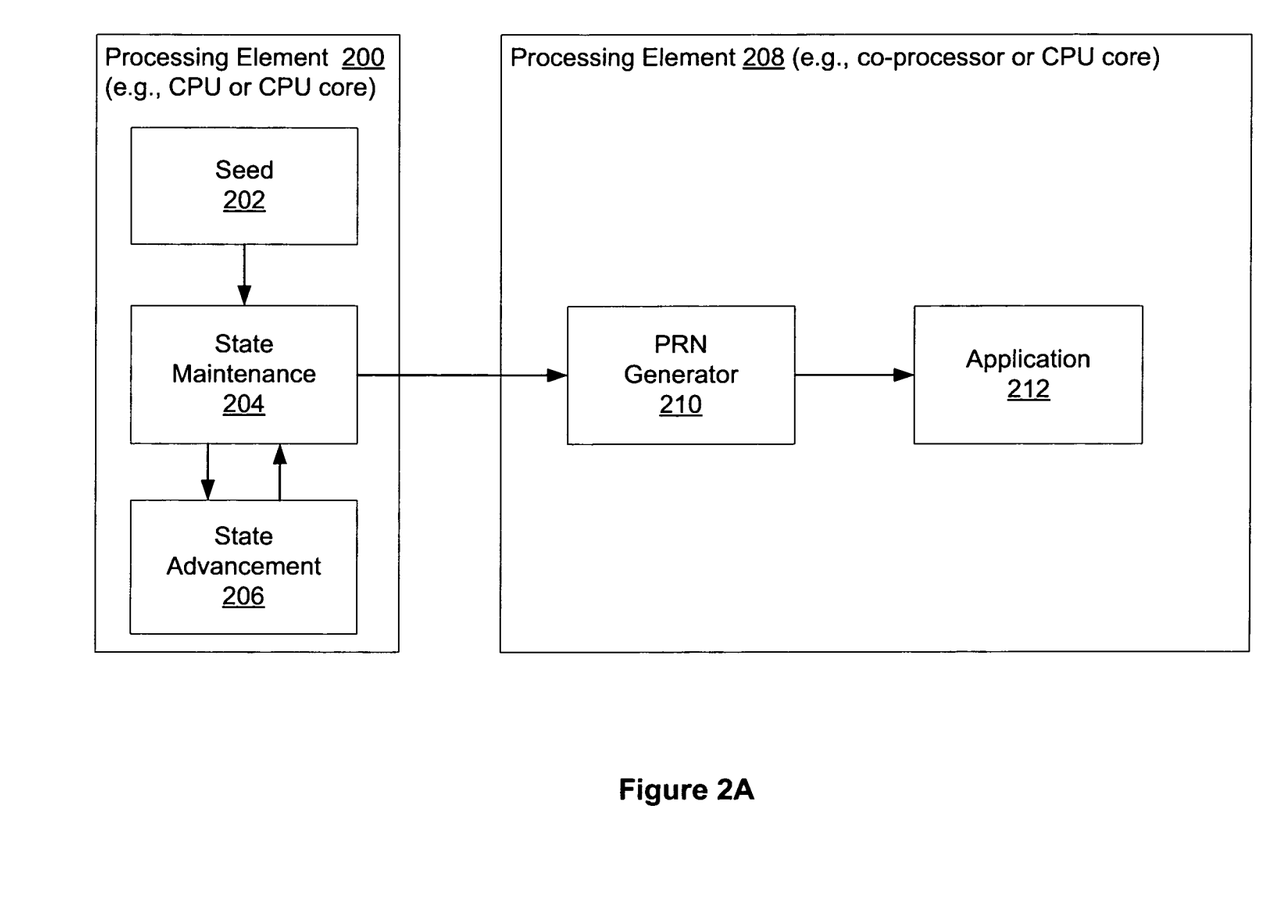
FIG. 2A is a block diagram of first and second processing elements, wherein the first processing element is configured to maintain and advance the state of a PRN generator implemented in the second processing element, in accordance with some embodiments.

FIG. 2A is a block diagram of a first processing element 200 and a second processing element 208 (e.g., a GPU), wherein the first processing element 200 is configured to maintain and advance the state of a PRN generator implemented in the second processing element 208, in accordance with some embodiments. In some embodiments, first processing element 200 is a CPU or a core of a multi-core CPU. In some embodiments, second processing element 208 is a co-processor, such as a GPU. In some embodiments, second processing element 208 is a core of a multi-core CPU that is distinct from first processing element 200.

The first processing element 200 stores an initial seed 202, which serves as an initial state and is provided to state maintenance operation 204. State maintenance operation 204 provides the state of the generator to the generator 210 in second processing element 208. Generator 210 generates an element or parallel elements corresponding to the provided state. State advancement operation 206 advances the state stored by state maintenance operation 204, which provides the updated state to generator 210 to generate the next sequential element or parallel elements. The generator 210 provides the resulting PRNs (i.e., the resulting elements) to an application 212.

In some embodiments, if PRN generator 210 is a CEICG, the state corresponds to the index $n_j$ and state advancement operation 206 advances the state in accordance with equation (10). In some embodiments, state advancement operation 206 generates and state maintenance operation 204 stores a plurality of sequential states, which are provided to generator 210 in a batch. For example, four to six sequential states may be provided to generator 210 in a batch. In other examples, ten or more sequential states, or a hundred or more sequential states may be provided to generator 210 in a batch. Generator 210 then generates the sequential elements corresponding to the sequential states in the batch.

In some embodiments, first processing element 200 may re-seed the state by providing a new seed to state maintenance operation 204.

In some embodiments, state advancement operation 206 advances the states corresponding to respective sub-sequences forward or backward by an arbitrary offset. For example, this facilitates the use of a random number generator in a cluster computing environment, where each cluster node has an offset seed.

Figure 2B:
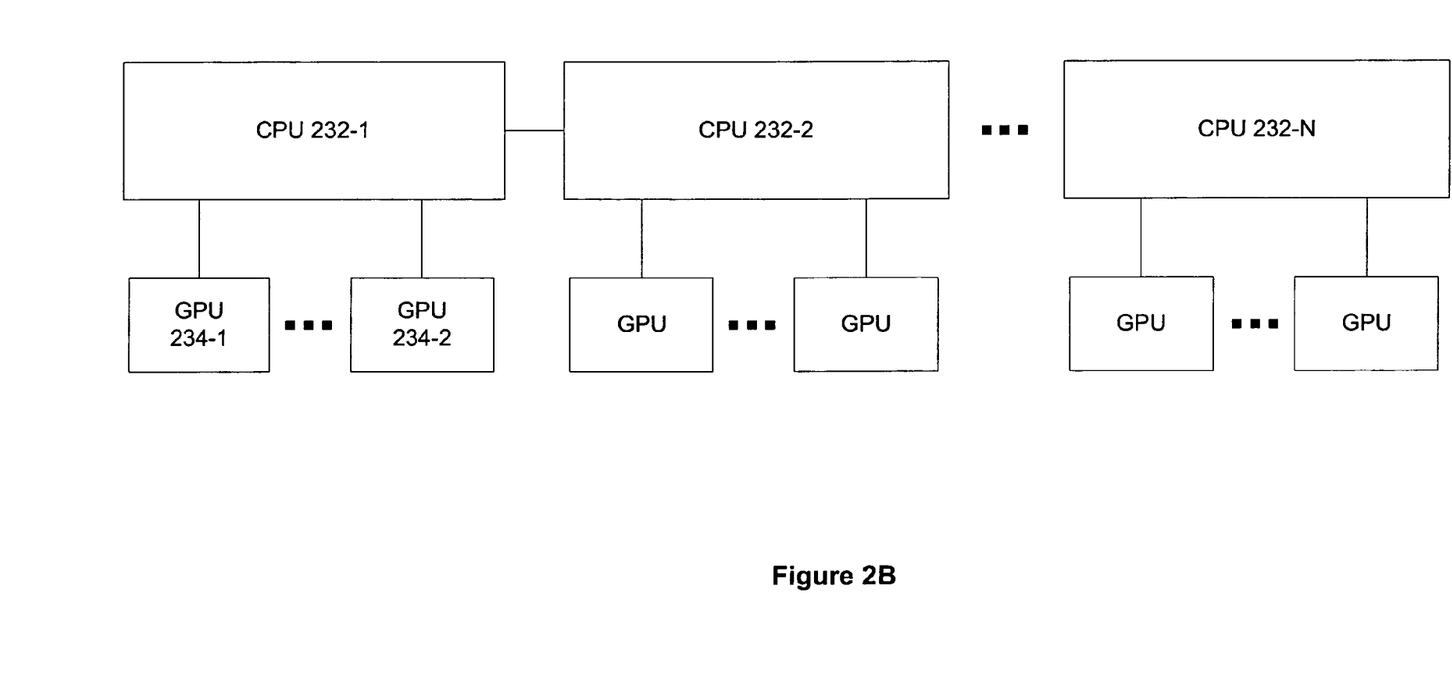
FIG. 2B is a block diagram of a cluster of CPUs in accordance with some embodiments.

FIG. 2B is a block diagram of a cluster of CPUs 232 in accordance with some embodiments. Coupled to a CPU 232 are one or more GPUs 234. Alternately, one or more co-processors other than GPUs are coupled to CPU 232. In some embodiments the one or more GPUs 234 coupled to a respective CPU 232 in the cluster compute a respective block or sub-sequence of a RNG. In some embodiments, the CPUs 232 maintain and advance state information while the GPUs 234 generate random numbers, as illustrated for a single CPU in FIG. 2A. Numerous cluster architectures for interconnecting the CPUs 232 are possible.

Attention is now directed to computation of an inverse modulus function. The inverse modulus function, which in some embodiments is performed by EICGs that constitute a CEICG, defines a sequence of period m. For example, if m is 7, the sequence is given by:

| k | | | | | | | | | | | | |
|---|---|---|---|---|---|---|---|---|---|---|---|---|
| 0 | 1 | 2 | 3 | 4 | 5 | 6 | 7 | 8 | 9 | 10 | 11 | ... |
| $\overline{k} \bmod 7$ | | | | | | | | | | | | |
| 0 | 1 | 4 | 5 | 2 | 3 | 6 | 0 | 1 | 4 | 5 | 2 | ... |

If m is small enough, a period of the sequence (shown in bold) may be stored in a table in memory. In some embodiments, in a CEICG the parent sequence of each component generator is iterated through many times, since the period of the combined generator is larger than the periods of each of the components. If the parent sequence is stored in a table, the algorithm for generating the output of a CEICG becomes dominated by computing table indices and reading from memory at those index locations. A table index can be computed from:

$$k_{j,s} = (n_j + n_{0j} + s(B \bmod m_j)) \bmod m_j \quad (11)$$

The table $T_j$ stores the precomputed values of the sequence for the $j^{th}$ component EICG in the CEICG:

$$T(k) = \overline{a_j k + c_j} \bmod m_j \quad (12)$$

for k in the interval $[0, m_j)$. Substituting Equation (11) into Equation (12) gives back Equation (8), the equation for the CEICG generator, taking into account the relation in Equation (9) where the modulus operation may be brought inside the inverse modulus operation.

As shown in Equation (11), the index for the reads for two adjacent streams s and s+1 are separated by the quantity (B mod $m_j$), with the possible exception of the indices near the end of the tables of length $m_j$, which have the property of "wrapping around" to the beginning of the table. In some embodiments, when the tables are in a memory accessed by multiple streams, the memory access pattern and thus the memory bandwidth may be improved by optimizing the value of the block size B and thus the parameter (B mod $m_j$). For example, in some embodiments values of B may be chosen that tend to make the memory access more sequential, thereby improving memory bandwidth.

In some embodiments, a CEICG is implemented in a DirectX 9 generation GPU, such as an AMD X1900 series GPU with 500 MHz clock and 594 MHz memory clock. Tiling modes of the X1900 are described in the AMD document "ATI CTM Guide: Technical Reference Manual" (2006), the contents of which are hereby incorporated by reference in their entirety. A 6-component generator (i.e., a CEICG comprising six EICGs) with 12-bit moduli implemented on the X1900 requires only 96 KB to store the lookup tables for computed inverse modulus functions and produces a sequence having a total sequence length ~$2^{72}$. In some embodiments, the six largest primes less than $2^{12}$ are used for the moduli. Parameters of such an embodiment are shown below.

TABLE 1

Parameters for a 6-Component CEICG

| j | $m_j$ | $a_j$ | $c_j$ |
|---|---|---|---|
| 1 | 4093 | 7 | 0 |
| 2 | 4091 | 11 | 0 |
| 3 | 4079 | 13 | 0 |
| 4 | 4073 | 17 | 0 |
| 5 | 4057 | 19 | 0 |
| 6 | 4051 | 23 | 0 |

Total period L = 4572003881581124177747 ≈ $2^{72}$

In some embodiments, the tables of inverse moduli are stored in the GPU's texture memory. A texture represents a set of values at pixel positions. A float4 texture stores four floating point values at each position (i,j), denoted R, G, B, and Alpha. A float1 texture stores a single floating point value at each position. The X1900 series GPU supports more than one mode of reading from textures. In the normal reading mode for float1 textures, a single float may be read at position (i,j). In the 2×2 tiled reading mode for float1 textures, four floats may be simultaneously read from four adjacent positions (i+1,j), (i,j+1), (i+1,j+1), and (i,j). The latter mode has substantially higher bandwidth to cache on the X1900 GPU. Table 2 shows the table layout below for the normal reading mode, with four bold boxes indicating four consecutive read operations for a component, corresponding to float4 (SIMD) output using the leapfrog method as shown in Equation (6). To make index computations simpler for the four consecutive reads, this table layout also accounts for the wrapping due to the modulus operation. The dimensions of this texture are 4096×6, with one column for each component EICG. There is unused space at the end of all columns except the first.

TABLE 2

Layout of inverse modulus tables in float1 texture for normal reading mode

| row | 1$^{st}$ EICG | 2$^{nd}$ EICG | 3$^{rd}$ EICG | 4$^{th}$ EICG | 5$^{th}$ EICG | 6$^{th}$ EICG |
|---|---|---|---|---|---|---|
| 0 | k = 0 | 0 | 0 | 0 | 0 | 0 |
| 1 | 1 | 1 | 1 | 1 | 1 | 1 |
| 2 | 2 | 2 | 2 | 2 | 2 | 2 |
| 3 | 3 | 3 | 3 | 3 | 3 | 3 |
| . | . | . | . | . | . | . |
| . | . | . | . | . | . | . |
| 4090 | 4090 | 4090 | | | | |
| 4091 | 4091 | 0 | | | | |
| 4092 | 4092 | 1 | | | | |
| 4093 | 0 | 2 | | | | |
| 4094 | 1 | unused | | | | |
| 4095 | 2 | unused | | | | |

To utilize the 2×2 tiled read mode, the lookup tables (e.g., Table 3, below) use 2 columns that are shifted by 2 per component EICG, in such a way that a single read instruction on the GPU reads four consecutive values from a given component table. The total space used by the table in this example is 192 KB, due to duplicating each column. The extra space beyond the end of the tables, which are each of length less than 4096, is filled with values copied from the beginning of the table so that reads near the end of the table do not have to be split. The layout of the 4096×12 texture storing the six component tables is shown below.

TABLE 3

Layout of inverse modulus tables in float1 texture for 2 × 2 tiled read mode

| row | 1$^{st}$ EICG | | 2$^{nd}$ EICG | | 3$^{rd}$ EICG | | 4$^{th}$ EICG | | 5$^{th}$ EICG | | 6$^{th}$ EICG | |
|---|---|---|---|---|---|---|---|---|---|---|---|---|
| 0 | k = 0 | 2 | 0 | 2 | 0 | 2 | 0 | 2 | 0 | 2 | 0 | 2 |
| 1 | 1 | 3 | 1 | 3 | 1 | 3 | 1 | 3 | 1 | 3 | 1 | 3 |
| 2 | 2 | 4 | 2 | 4 | 2 | 4 | 2 | 4 | 2 | 4 | 2 | 4 |
| 3 | 3 | 5 | 3 | 5 | 3 | 5 | 3 | 5 | 3 | 5 | 3 | 5 |
| . | . | . | . | . | . | . | . | . | . | . | . | . |
| . | . | . | . | . | . | . | . | . | . | . | . | . |
| 4090 | 4090 | 4092 | 4090 | 1 | | | | | | | | |
| 4091 | 4091 | 0 | 0 | 2 | | | | | | | | |
| 4092 | 4092 | 1 | unused | unused | | | | | | | | |
| 4093 | 0 | 2 | unused | unused | | | | | | | | |
| 4094 | unused | unused | unused | unused | | | | | | | | |
| 4095 | unused | unused | unused | unused | | | | | | | | |

The four bold boxes indicate where a single read operation for the 1$^{st}$ component generator (which has prime modulus 4093) will gather 4 consecutive elements, accounting for the wrapping that occurs due to the modulus operation.

Using the GPU's programmable pixel shader unit, each pixel position (x,y) may be thought of as being in a separate thread of execution. The hardware manages the scheduling of the actual threads running on the 48 float4 processing cores. The number of pixel positions is determined by the maximum framebuffer size, which is 4096×4096 float4s for the X1900. In some embodiments, the stream index s in the table lookup formulas is then computed based on the pixel position. For example, the stream index s may be defined as:

$$s = x + 4096y \tag{13}$$

Because the X1900 has 16M (i.e., $2^{24}$) independent pixel positions, the block size B for each sub-sequence must obey the restriction:

$$B \leq \frac{L}{2^{24}} = B_{\max} = 272512667273350 \approx 2^{48} \tag{14}$$

When $B = B_{max}$ the sub-sequence associated with each pixel position is the maximum possible length. However, for values of $B < B_{max}$, some sub-sequence length may be sacrificed to optimize the values of (B mod $m_j$). For example, reducing the sub-sequence length by no more than 0.025% from $B_{max}$ yields 68 billion possible combinations of the parameters (B mod $m_j$) that may be searched to optimize the rate of random number generation. In some embodiments, performance is substantially improved or optimized when at least one of the (B mod $m_j$) values of component EICGs is either 1 or ($m_j$–1). These values imply that two adjacent pixel positions will be reading from adjacent memory in the lookup table, for at least one of the six component generators. A search of the possible combinations of the parameters (B mod $m_j$) may be limited to those combinations for which at least one of the (B mod $m_j$) values of component EICGs is either 1 or ($m_j$–1). For example, a brute-force search through this set of values may be performed to optimize the rate of random number generation. Table 4 shows an example of values of (B mod $m_j$) for an optimized block size B for an embodiment in which the six largest primes less than $2^{12}$ are used for the moduli.

TABLE 4

Values of (B mod $m_j$) for optimized block size Bopt

| j | $m_j$ | $B_{opt}$ mod $m_j$ |
|---|---|---|
| 1 | 4093 | 1362 |
| 2 | 4091 | 2338 |
| 3 | 4079 | 1360 |
| 4 | 4073 | 1891 |
| 5 | 4057 | 1 |
| 6 | 4051 | 4050 |

In some embodiments, performance is substantially improved or optimized when at least one of the (B mod $m_j$) values of component EICGs is zero. A component EICG for which (B mod $m_j$) equals zero is said to have zero stride: its value is the same for a given seed for all parallel threads. Such a generator thus sacrifices quality of the random number sequence for performance, which may be an acceptable sacrifice in some applications.

In some embodiments, the speed of a RNG that computes inverse modulus functions by performing table lookups is limited by the rate of reading the lookup tables. Therefore, additional floating point operations may be coupled with the generator at zero or near-zero cost. In some embodiments, these additional floating point operations are used to condition the PRNs generated by the RNG. For example, a Gaussian random number generator may be created, based on a RNG that uses table lookups, using the Box-Muller method.

In some embodiments, operations for other applications that use random number sequences generated by a RNG may be combined with operations for the RNG in compiled programs, such as a compiled GPU program. In some embodiments, the generated pseudorandom numbers are stored in registers during execution of the program, and need never be written to main memory. For example, PRNs may be generated, consumed, and discarded in a local program running on a particular thread, independently of other threads. Furthermore, in some embodiments, multiple RNG evaluations with different seeds may be packed into a single compiled program with the common instructions factored out.

Attention is now directed to implementing linear random number generators in a parallel computing environment. Linear generators are defined as generators whose basic operations consist only of multiplication, addition, and modulus. In some embodiments, linear generators are implemented in GPUs having multiple outputs per thread. For example, a linear generator may involve thousands or tens of thousands of outputs per thread. In some embodiments a linear generator is implemented in a GPU based on nVidia's Compute Unified Device Architecture (CUDA), such as the G80 processor (e.g., the GeForce 8800), for which the number of outputs per thread is arbitrary. CUDA is described in "NVIDIA CUDA Compute Unified Device Architecture Programming Guide Version 0.8" (Feb. 12, 2007), which is hereby incorporated by reference in its entirety. In some embodiments, multiple outputs per thread are provided by a hardware scatter operation, in which a thread may write to multiple locations in an output target. Pixel position in the GPU designates a particular random number sub-sequence whose state may be read from input textures In some embodiments, a linear generator referred to as MRG32k3a is implemented in a GPU with multiple outputs per thread. The basic update step of MRG32k3a is $$x_{1,n} = (ax_{1,n-2} - bx_{1,n-3}) \bmod m_1 \quad (15)$$

$$x_{2,n} = (cx_{2,n-1} - dx_{2,n-3}) \bmod m_2 \quad (16)$$

$$u_n = \frac{x_{1,n}}{m_1} + \frac{x_{2,n}}{m_2} \quad (17)$$

where the values of the constants are given in Table 5.

TABLE 5

| MRG32k3a Parameters | |
| --- | --- |
| constant | value |
| $m_1$ | 4294967087 |
| $m_2$ | 4294944443 |
| a | 1403580 |
| b | 810728 |
| c | 527612 |
| d | 1370589 |

In some embodiments of the MRG32k3a generator, to achieve greater than single precision floating point arithmetic, numbers are represented by partitioning them into 2 or 3 values, depending on whether they are 32-bit generator state or 53-bit intermediate quantities, respectively. An extended range integer is represented by $$x = x_0 + x_1 2^{24} + x_2 2^{48} \quad (18)$$

if 53 bits are required, and $x_2=0$ if only 32 bits are required. The algorithm to add or subtract two such extended range integers is an extension of a paper and pencil method with carry and borrow. The algorithm to multiply two such numbers relies on further factoring the numbers according to $$x = x_l + 4096 x_h \quad (19)$$

and again keeping track of the carry digits as in the paper and pencil method. The modulus may be computed by the Barrett modular reduction algorithm, which relies on storing the numbers $[2^{64}/m_k]$ and using multiplication and division by powers of 2. Finally the division by $m_k$ in Equation (17) is done by storing $1/m_k$ in the form $$1/m_k = d_0 2^{-24} + d_1 2^{-36} + d_2 2^{-48} \quad (20)$$

that produces sufficient accuracy in the final floating point result.

In some embodiments, each thread computes a block from a linear random number generator such as MRG32k3a. The number of threads is chosen to be small enough that the state information is manageable. In an example involving MRG32k3a, which has a state of 48 bytes, a limit of 4 MB of state information would correspond to 87,000 threads.

In some embodiments, a Wichmann-Hill generator is implemented on a GPU with numerous outputs per thread. The Wichmann-Hill generator is a family of 273 generators, each of which may be further split, for example by blocking, by leapfrogging, and/or by parameterizing sub-sequences. The update step for the Wichmann-Hill generator is $$x_{1,n} = (c_1 x_{1,n-1}) \bmod m_1$$

$$x_{2,n} = (c_2 x_{2,n-1}) \bmod m_2$$

$$x_{3,n} = (c_3 x_{3,n-1}) \bmod m_3$$

$$x_{4,n} = (c_4 x_{4,n-1}) \bmod m_4$$

$$u_n = \left(\frac{x_{1,n}}{m_1} + \frac{x_{2,n}}{m_2} + \frac{x_{3,n}}{m_3} + \frac{x_{4,n}}{m_4}\right) \bmod 1$$

In an embodiment, 256 sub-sequences would each output 65536 values to fill up a render target of size (4096, 4096). In this example, the constants vary in the range $$16718909 \leq m_k \leq 16776971$$

$$112 \leq c_k \leq 127$$

In some embodiments, a generator such as the Wichmann-Hill generator may be "skipped ahead": the sub-sequence state may be updated, for example, on a CPU while a GPU computes random numbers, as illustrated in FIG. 2.

Figure 3A:
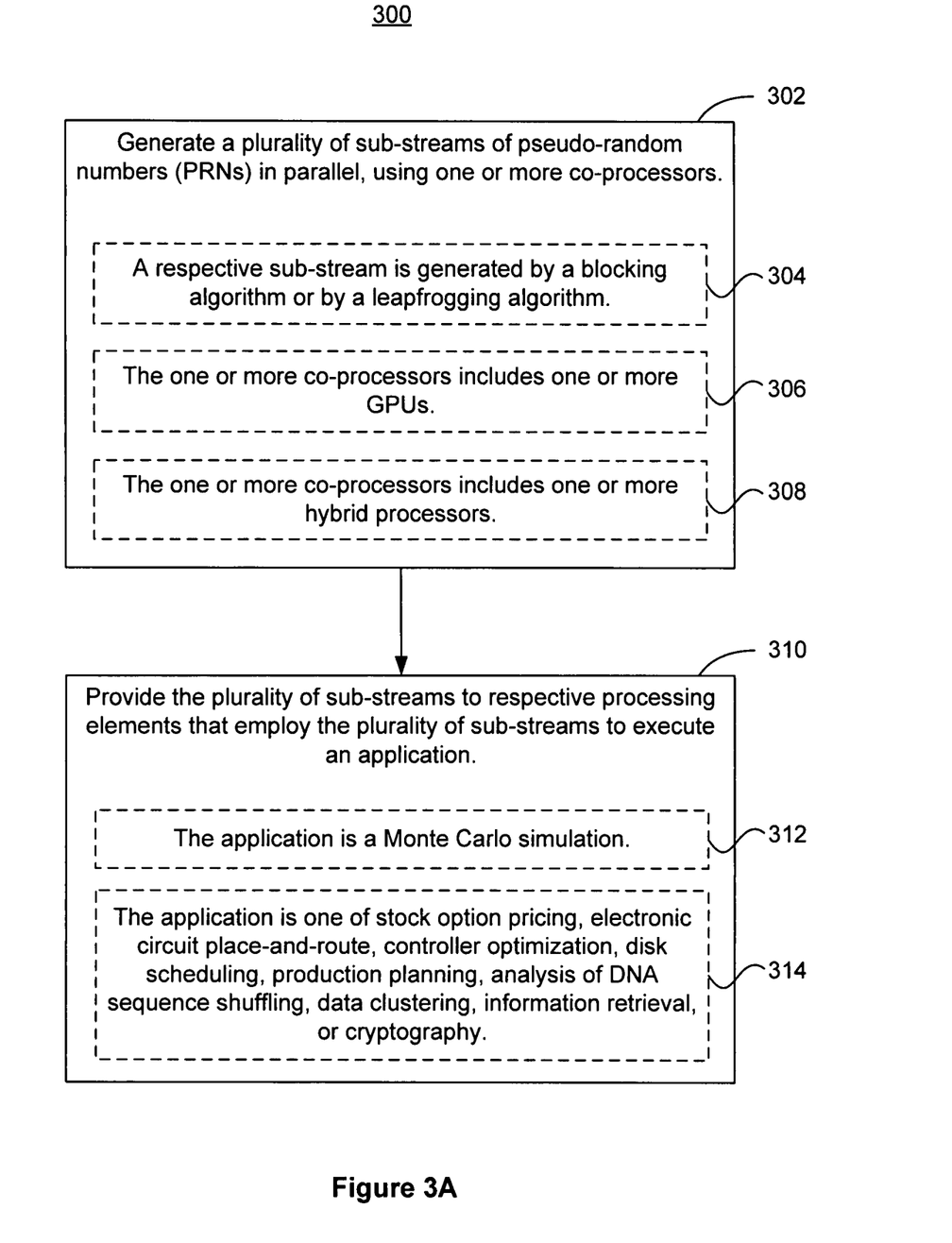
FIGS. 3A-3C are flow diagrams illustrating methods for generating pseudo-random numbers on a parallel processing system in accordance with some embodiments.

FIG. 3A is a flow diagram illustrating a method 300 of generating pseudo-random numbers on a parallel processing system in accordance with some embodiments. A plurality of sub-streams of pseudo-random numbers (PRNs) is generated in parallel by one or more co-processors (302). In some embodiments, thousands of sub-streams are generated in parallel, or millions of sub-streams are generated in parallel.

In some embodiments, a respective sub-stream in the plurality of sub-streams is generated in accordance with a blocking algorithm (e.g., sub-sequences 102, FIG. 1A) or with a leapfrogging algorithm (e.g., sub-sequences 122, FIG. 1B) (304).

In some embodiments, the one or more co-processors include one or more GPUs (306). In some embodiments, the one or more co-processors include one or more hybrid processors (308).

The plurality of sub-streams is provided to respective processing elements that employ the plurality of sub-streams to execute an application (310). In some embodiments, the application is a Monte Carlo simulation (312). In some embodiments, the application is one of stock option pricing, electronic circuit place-and-route, controller optimization, disk scheduling, production planning, analysis of DNA sequence shuffling, data clustering, information retrieval, or cryptography (314).

Figure 3B:
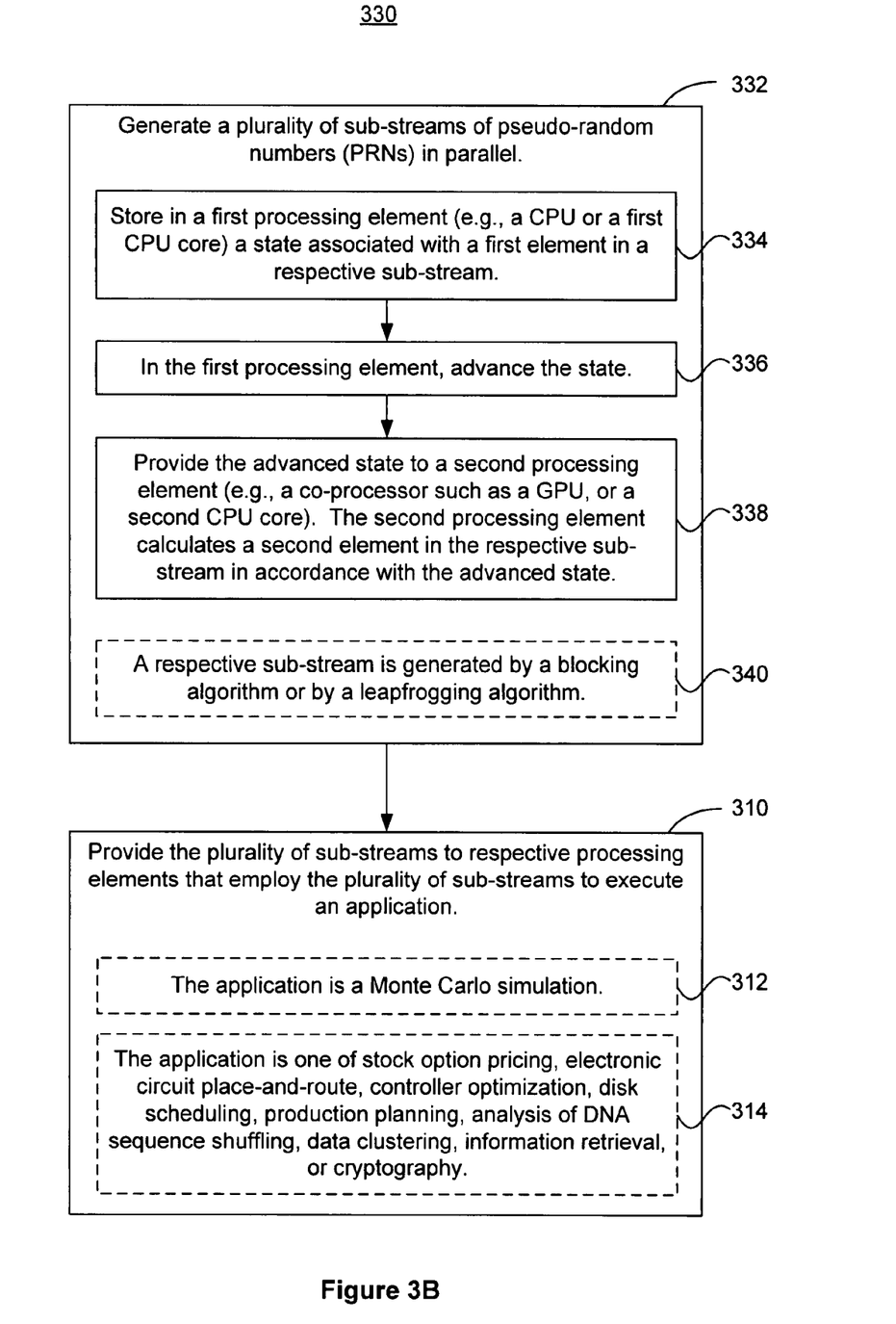

FIG. 3B is a flow diagram illustrating a method 330 of generating pseudo-random numbers on a parallel processing system in accordance with some embodiments. A plurality of sub-streams of pseudo-random numbers (PRNs) is generated in parallel (332). Generating the plurality of sub-streams includes storing in a first processing element (e.g., processing element 200, FIG. 2A) a state associated with a first element (i.e., a particular pseudo-random number) in a respective sub-stream (334). In some embodiments, the first processing element is a CPU or a first core of a multi-core CPU. In the first processing element, the state is advanced (336). For example, state advancement operation 206 advances the state stored by state maintenance operation 204. The advanced state is provided to a second processing element (e.g., processing element 208, FIG. 2A). In some embodiments, the second processing element is a co-processor (e.g., a GPU) or a second core of the multi-core CPU. The second processing element calculates a second element in the respective sub-stream in accordance with the advanced state (338).

In some embodiments, a respective sub-stream in the plurality of sub-streams is generated in accordance with a blocking algorithm (e.g., sub-sequences 102, FIG. 1A) or with a leapfrogging algorithm (e.g., sub-sequences 122, FIG. 1B) (340).

The plurality of sub-streams is provided to respective processing elements that employ the plurality of sub-streams to execute an application (310). In some embodiments, the application is a Monte Carlo simulation (312). In some embodiments, the application is one of stock option pricing, electronic circuit place-and-route, controller optimization, disk scheduling, production planning, analysis of DNA sequence shuffling, data clustering, information retrieval, or cryptography (314).

Figure 3C:
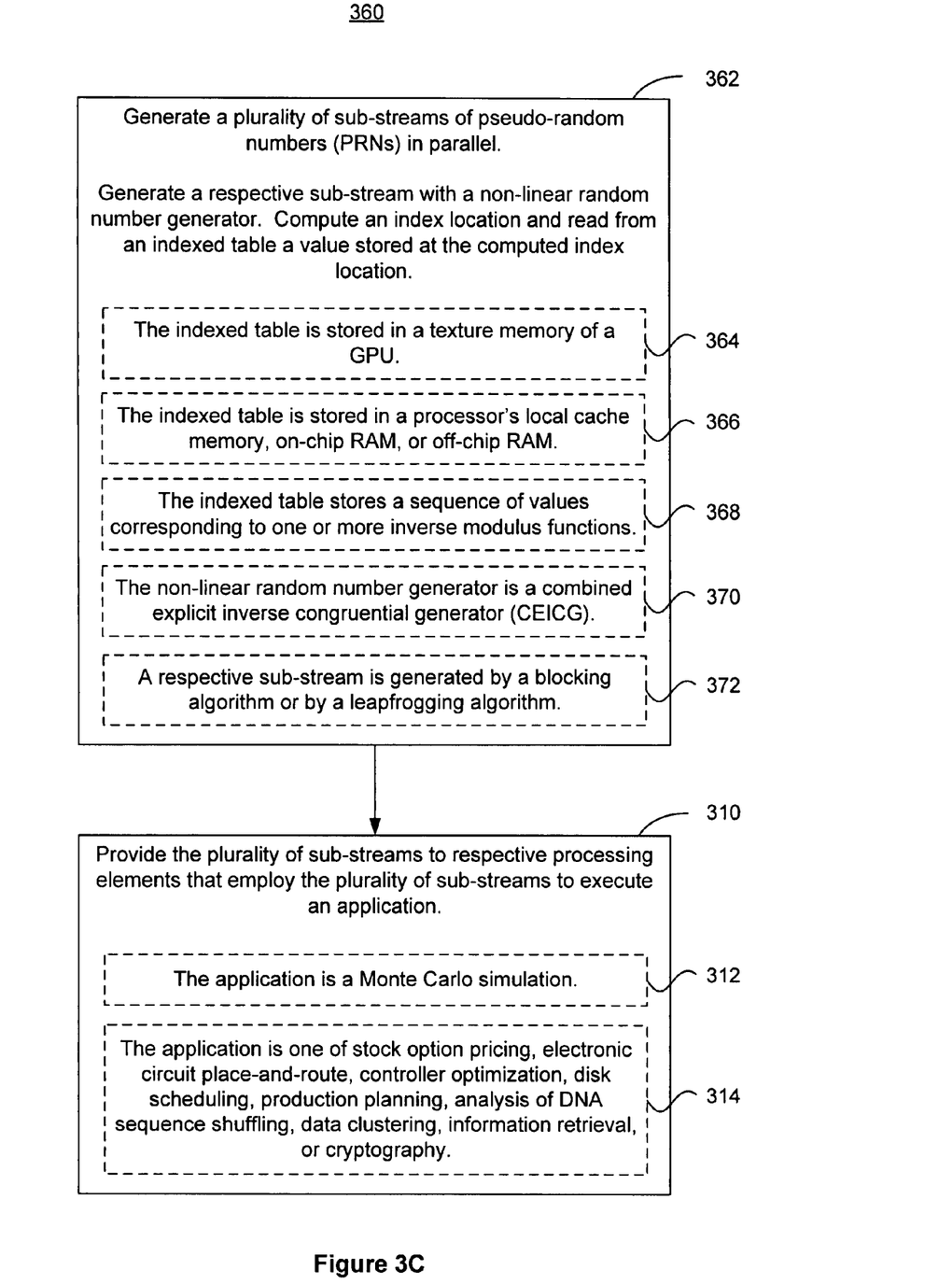

FIG. 3C is a flow diagram illustrating a method 360 of generating pseudo-random numbers on a parallel processing system in accordance with some embodiments. A plurality of sub-streams of pseudo-random numbers (PRNs) is generated in parallel. A respective sub-stream is generated with a non-linear random number generator. Generating the respective sub-stream includes computing an index location and reading from an indexed table a value stored at the computed index location (362).

In some embodiments, the indexed table is stored in a texture memory of a GPU (364). In some embodiments, the indexed table is stored in a processor's local cache memory, in a processor's on-chip RAM, or in a processor's off-chip RAM (366). In some embodiments, the indexed table stores a sequence of values corresponding to one or more inverse modulus functions (368). Index locations may be computed, for example, according to equation (11).

In some embodiments, the non-linear random number generator is a CEICG (370). In some embodiments, the CEICG comprises a plurality of EICGs, wherein each respective EICG is characterized by a distinct prime modulus m. In some embodiments, each respective EICG is further characterized by a length B, and a value of (B mod m) for a respective EICG equals one of (m−1) and 1.

In some embodiments, the plurality of sub-streams is generated by one or more co-processors. In some embodiments, the plurality of sub-streams is generated by one or more cores of one or more multi-core CPUs. In some embodiments, the plurality of sub-streams is generated by a cluster of computer systems. In some embodiments, the plurality of sub-streams is generated by a plurality of processors, wherein two or more processors of the plurality of processors have distinct instruction set architectures.

In some embodiments, a respective sub-stream in the plurality of sub-streams is generated in accordance with a blocking algorithm (e.g., sub-sequences 102, FIG. 1A) or with a leapfrogging algorithm (e.g., sub-sequences 122, FIG. 1B) (372).

The plurality of sub-streams is provided to respective processing elements that employ the plurality of sub-streams to execute an application (310). In some embodiments, the application is a Monte Carlo simulation (312). In some embodiments, the application is one of stock option pricing, electronic circuit place-and-route, controller optimization, disk scheduling, production planning, analysis of DNA sequence shuffling, data clustering, information retrieval, or cryptography (314).

Figure 4:
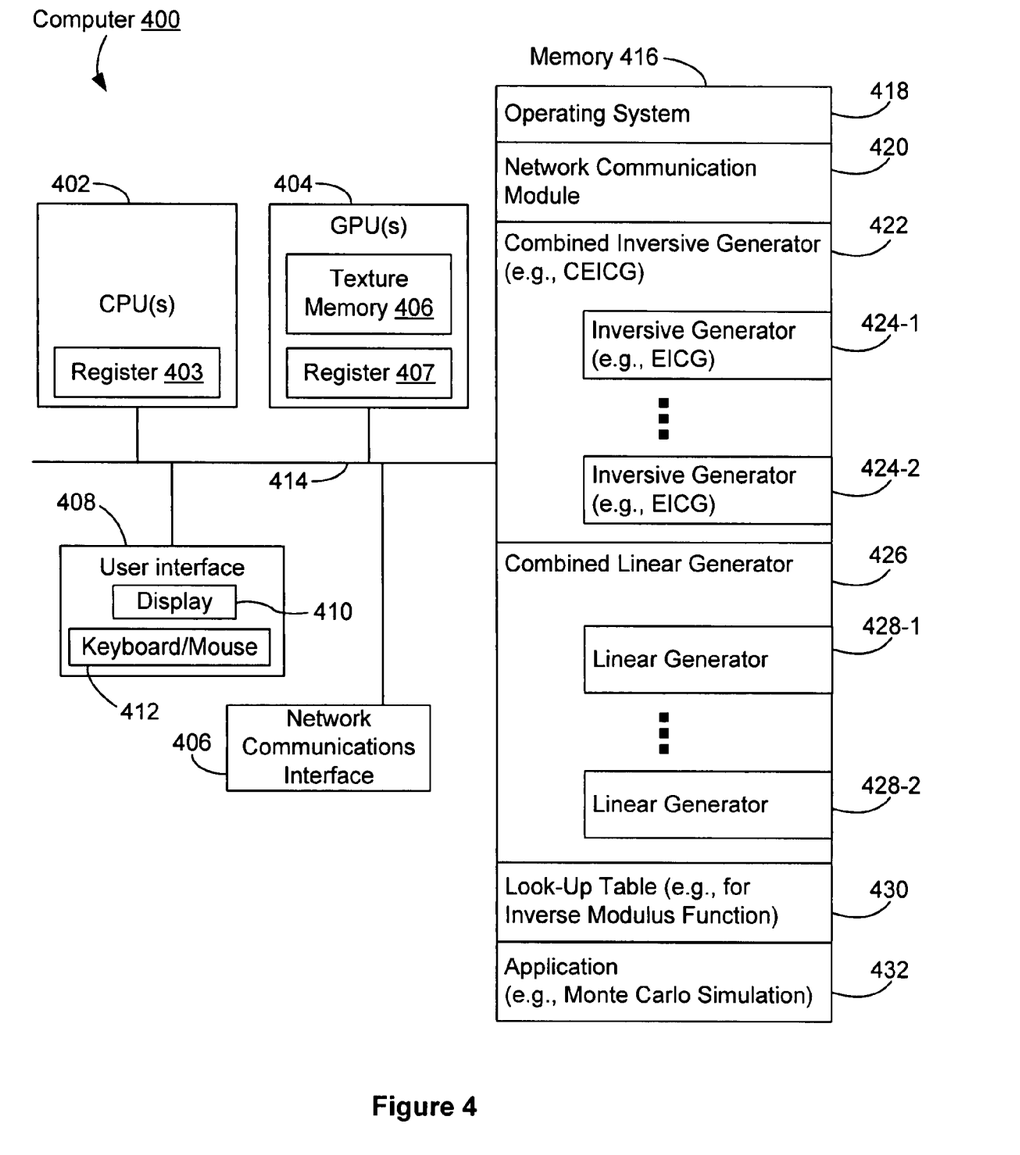
FIG. 4 is a block diagram illustrating a computer in accordance with some embodiments.

FIG. 4 is a block diagram illustrating a computer 400 in accordance with some embodiments. In some embodiments, a RNG process such as processes 300, 330, or 360 are implemented on computer 400. The computer 400 typically includes one or more central processing units (CPUs) 402, one or more graphics processing units (GPUs) 404, one or more network or other communications interfaces 406, memory 416, and one or more communication buses 414 for interconnecting these components. The one or more CPUs 402 and/or the one or more GPUs 404 may include respective registers 403 and 407 that may store generated pseudorandom numbers. The computer 400 also may include one or more co-processors (not shown) in place of or in addition to GPU(s) 404. The one or more network or other communications interfaces 406 may connect computer 400 to other computers in a cluster of computer systems. The communication buses 414 may include circuitry (sometimes called a chipset) that interconnects and controls communications between system components. The client computer 400 may also include a user interface 408 comprising a display device 410 and a keyboard and/or mouse (or other pointing device) 412. Memory 416 includes high-speed random access memory, such as DRAM, SRAM, DDR RAM or other random access solid state memory devices; and may include non-volatile memory (including a non-transitory computer readable storage medium), such as one or more magnetic disk storage devices, optical disk storage devices, flash memory devices, or other non-volatile solid state storage devices. The memory 416 may optionally include one or more storage devices remotely located from the CPU(s) 402. Memory 416 may also include a GPU texture memory 406. In some embodiments, memory 404 stores the following programs, modules and data structures, or a subset thereof:

an operating system 418 that includes procedures for handling various basic system services and for performing hardware dependent tasks;

a network communication module 420 that is used for connecting computer 400 to other computers via the one or more communication network interfaces 406 and one or more communication networks, such as the Internet, other wide area networks, local area networks, metropolitan area networks, and so on;

a set of instructions 422 for implementing a combined inversive generator (e.g., a CEICG), including one or more sets of instructions 424 for implementing component inversive generators (e.g., EICGs);

a set of instructions 426 for implementing a combined linear generator (e.g., MRG32k3a or Wichmann-Hill), including one or more sets of instructions 428 for implementing component linear generators;

a look-up table 430 (e.g., for storing a set of values corresponding to an inverse modulus function); and an application 432 (e.g., a Monte Carlo simulation).

Each of the above identified elements in FIG. 4 may be stored in one or more of the previously mentioned memory devices. Each of the above identified programs, modules, and applications corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 404 may store a subset of the modules and data structures identified above. Furthermore, memory 404 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of generating pseudo-random numbers, comprising:

in a runtime system configured to run on a parallel-processing computer system that includes a first processor and a plurality of co-processors and memory storing one or more programs for execution by the first processor and the plurality of co-processors, at runtime:

receiving one or more operation requests from an application, the one or more operation requests comprising requests for a plurality of pseudo-random number sub-streams;

selecting respective ones of the plurality of co-processors for executing the pseudo-random number generators;

generating a plurality of sub-streams of pseudo-random numbers, wherein the sub-streams are generated in parallel by the selected co-processors; and providing the plurality of sub-streams to respective co-processors, wherein each co-processor is configured to employ one of the plurality of sub-streams to execute the application;

wherein generating the plurality of sub-streams comprises:

in the first processor, storing a state associated with a first element in a respective sub-stream of the plurality of sub-streams;

in the first processor, advancing the state;

providing the advanced state to a respective co-processor of the plurality of co-processors, wherein the respective co-processor calculates a second element in the respective sub-stream in accordance with the advanced state; and at one of the plurality of co-processors:

computing, for a sub-stream, an index location; and reading, from an indexed table, a value stored at the computed index location, wherein the indexed table for a respective sub-stream is stored in a texture memory of one of the co-processors that is a graphics processing unit.

2. The method of claim 1, wherein the first processor is a CPU.

3. The method of claim 2, wherein the respective co-processor is a GPU.

4. The method of claim 1, wherein the first processor is a first core of a multi-core CPU.

5. The method of claim 4, wherein at least one of the plurality of co-processors is a second core of the multi-core CPU.

6. The method of claim 1, wherein the application is a Monte Carlo simulation.

7. The method of claim 1, wherein the application is one of stock option pricing, electronic circuit place-and-route, controller optimization, disk scheduling, production planning, analysis of DNA sequence shuffling, data clustering, information retrieval, or cryptography.

8. The method of claim 1, wherein a respective sub-stream in the plurality of sub-streams is generated by a blocking algorithm wherein the plurality of sub-streams can be cascaded one by one into a random number sequence such that each sub-stream occupies a consecutive portion of the random number sequence.

9. The method of claim 1, wherein a respective sub-stream in the plurality of sub-streams is generated by a leapfrogging algorithm wherein members of the plurality of sub-streams are evenly distributed within a random number sequence such that any two consecutive members of each sub-stream are separated from each other by a predefined distance within the random number sequence.

10. The method of claim 1, wherein the selected co-processors are a plurality of graphics processing units.

11. A parallel processing system for generating pseudo-random numbers, comprising:

a first processor;

a plurality of co-processors; and memory storing at least one program for execution by the first processor and the plurality of co-processors, the at least one program comprising instructions for:

at runtime:

receiving one or more operation requests from an application, the one or more operation requests comprising requests for a plurality of pseudo-random number sub-streams;

selecting respective ones of the plurality of co-processors for executing the pseudo-random number generators;

generating a plurality of sub-streams of pseudo-random numbers, wherein the sub-streams are generated in parallel by the selected co-processors; and providing the plurality of sub-streams to respective co-processors, wherein each co-processor is configured to employ one of the plurality of sub-streams to execute the application;

wherein generating the plurality of sub-streams comprises:
in the first processor, storing a state associated with a first element in a respective sub-stream of the plurality of sub-streams;
in the first processor, advancing the state;
providing the advanced state to a respective co-processor of the plurality of co-processors, wherein the respective co-processor calculates a second element in the respective sub-stream in accordance with the advanced state; and
at one of the plurality of co-processors:
computing, for a sub-stream, an index location; and
reading, from an indexed table, a value stored at the computed index location, wherein the indexed table for a respective sub-stream is stored in a texture memory of one of the co-processors that is a graphics processing unit.

12. A non-transitory computer readable storage medium storing one or more programs configured to be executed by a parallel processing computer system with a first processor and plurality of co-processors, the one or more programs comprising instructions for:
at runtime:
receiving one or more operation requests from an application, the one or more operation requests comprising requests for a plurality of pseudo-random number sub-streams;
selecting respective ones of the plurality of co-processors for executing the pseudo-random number generators;
generating a plurality of sub-streams of pseudo-random numbers, wherein the sub-streams are generated in parallel by the selected co-processors; and
providing the plurality of sub-streams to respective co-processors, wherein each co-processor is configured to employ one of the plurality of sub-streams to execute the application
wherein generating the plurality of sub-streams comprises:
in the first processor, storing a state associated with a first element in a respective sub-stream of the plurality of sub-streams;
in the first processor, advancing the state;
providing the advanced state to a respective co-processor of the plurality of co-processors, wherein the respective co-processor calculates a second element in the respective sub-stream in accordance with the advanced state; and
at one of the plurality of co-processors:
computing, for a sub-stream, an index location; and
reading, from an indexed table, a value stored at the computed index location, wherein the indexed table for a respective sub-stream is stored in a texture memory of one of the co-processors that is a graphics processing unit.

13. A parallel processing system for generating pseudo-random numbers, comprising:
in a runtime system configured to run on a parallel-processing computer system that includes a first processor and a plurality of co-processors and memory storing one or more programs for execution by the first processor and the plurality of co-processors:
means for, at runtime, receiving one or more operation requests from an application, the one or more operation requests comprising requests for a plurality of pseudo-random number sub-streams;
means for, at runtime, selecting respective ones of the plurality of co-processors for executing the pseudo-random number generators;
means for, at runtime, generating a plurality of sub-streams of pseudo-random numbers, wherein the sub-streams are generated in parallel by the selected co-processors; and
means for, at runtime, providing the plurality of sub-streams to respective co-processors, wherein each co-processor is configured to employ one of the plurality of sub-streams to execute the application;
wherein generating the plurality of sub-streams comprises:
in the first processor, storing a state associated with a first element in a respective sub-stream of the plurality of sub-streams;
in the first processor, advancing the state;
providing the advanced state to a respective co-processor of the plurality of co-processors, wherein the respective co-processor calculates a second element in the respective sub-stream in accordance with the advanced state; and
at one of the plurality of co-processors:
computing, for a sub-stream, an index location; and
reading, from an indexed table, a value stored at the computed index location, wherein the indexed table for a respective sub-stream is stored in a texture memory of one of the co-processors that is a graphics processing unit.

* * * * *